United States Patent [19]

Okubo

[11] Patent Number: 4,910,229

[45] Date of Patent: Mar. 20, 1990

[54] PROCESS FOR PRODUCING HOLLOW POLYMER LATEX PARTICLES

[75] Inventor: Masayoshi Okubo, Kobe, Japan

[73] Assignee: Nippon Zeon Co., Ltd., Tokyo, Japan

[21] Appl. No.: 329,513

[22] Filed: Mar. 28, 1989

[51] Int. Cl.$^4$ ............................................... C08J 9/28
[52] U.S. Cl. ........................................ 521/72; 521/56; 521/60; 521/61; 521/64; 521/65; 524/460
[58] Field of Search .................. 521/56, 60, 61, 64, 521/65, 72

[56] References Cited

U.S. PATENT DOCUMENTS

| | | | |
|---|---|---|---|
| 3,615,972 | 10/1971 | Morehouse, Jr. et al. | 521/145 |
| 3,620,988 | 11/1971 | Cohen | 524/834 |
| 3,691,140 | 9/1972 | Silver | 524/829 |
| 4,049,604 | 9/1974 | Morehouse, Jr. et al. | 524/460 |
| 4,166,152 | 8/1975 | Baker et al. | 524/745 |
| 4,191,672 | 3/1980 | Salome | 524/460 |
| 4,427,836 | 1/1984 | Kowalski et al. | 524/460 |
| 4,459,378 | 7/1984 | Ugelstad | 524/460 |
| 4,495,318 | 1/1985 | Howard | 524/460 |
| 4,594,363 | 6/1986 | Blankewship | 521/64 |
| 4,598,112 | 7/1986 | Howard | 524/460 |
| 4,829,102 | 5/1989 | Biale | 524/460 |

*Primary Examiner*—Morton Foelak
*Attorney, Agent, or Firm*—Sherman and Shalloway

[57] ABSTRACT

A process for producing hollow polymer latex particles, which comprises (1) adding a base to a carboxyl-containing polymer latex obtained by emulsion polymerization of a monomeric mixture composed of at least 0.1% by weight of an ethylenically unsaturated carboxylic acid and another ethylenically unsaturated monomer copolymerization with the carboxylic acid to adjust the pH of the polymer latex to at least 7 and swell the polymer latex particles, and (2) adding an acid to the polymer latex formed in (1) to adjust the pH of the latex to not more than 7.

6 Claims, No Drawings

PROCESS FOR PRODUCING HOLLOW POLYMER LATEX PARTICLES

This invention relates to a process for producing hollow polymer latex particles.

Hollow polymer latices have been used in water-base paint compositions, paper coating compositions, etc. The hollow polymer particles have more interfaces between the polymer and air having very different refractive indices from each other than conventional non-hollow polymer particles. Accordingly, as one component of such a composition as a water-base paint composition, the hollow polymer particles decrease light transmittance and function as a hiding agent or a white pigment having a high hiding power. As a result, a coated film prepared from the composition has excellent opacity, hiding property, whiteness and gloss.

When the hollow polymer latex is used in a paper coating composition, it improves the opacity, whiteness and gloss of coated paper or art paper for the same reason as stated above with regard to the water-base paint.

U.S. Pat. Nos. 4,427,836 and 4,594,363 disclose a process for producing polymer particles containing voids, which comprises preparing core polymer particles containing acid groups in an amount sufficient to swell the polymer particles by neutralization with a volatile base such as ammonia and then forming a sheath polymer permeable to the base on the surface of the core by sequential emulsion polymerization, adding the base to the resulting aqueous dispersion of the core-sheath polymer particles to neutralize and swell the polymer particles and then drying them to form particles having microvoids.

The process disclosed in these U.S. Patents is carried out in two steps and is therefore complex. It is difficult to control the reaction temperature and the amounts of polymerization initiator and the surface-active agent so as to cause the sheath polymer to cover only the surface layer of the core polymer particles. In many cases it is impossible to perform the polymerization such that only the surface layer of the core polymer particles is covered by the sheath polymer. New particles occur, or the unsaturated carboxylic acid in the core polymer particles migrates to the surface of the final particles.

It is an object of this invention to provide a process for producing hollow particles by a simple operation without going through complex steps.

According to this invention, there is provided a process for producing hollow polymer latex particles, which comprises (1) adding a base to a carboxyl-containing polymer latex obtained by emulsion polymerization of a monomeric mixture composed of at least 0.1% by weight of an ethylenically unsaturated carboxylic acid and another ethylenically unsaturted monomer copolymerizable with the carboxylic acid to adjust the pH of the polymer latex to at least 7 and swell the polymer latex particles, and (2) adding an acid to the polymer latex formed in (1) to adjust the pH of the latex to not more than 7.

The process of this invention enables hollow polymer particles to be produced by simplified production and treating steps as compared with the prior art. The carboxyl-containing polymer latex used in this invention may be any latices of polymers containing carboxyl groups irrespective of other monomer components.

The ethylenically unsaturated carboxylic acid or carboxyl-containing monomers may be, for example, acrylic acid, methacrylic acid, itaconic acid and fumaric acid. They may be used singly or in combination. Preferably, these carboxyl-containing monomers are used in an amount of 0.1 to 40% by weight based on the monomeric mixture. If the amount is less than 0.1% by weight, the resulting polymer is difficult to swell by treatment with a base and an acid, and any swelling which may occur has a low effect. If the amount exceeds 40% by weight, a large amount of coagulated matter occurs during the polymerization for producing the copolymer latex. The preferred amount of the ethylenically unsaturated carboxylic acid is 0.5 to 20% by weight.

Examples of other ethylenically unsaturated monomers copolymerizable with the ethylenically unsaturated carboxylic acid include aromatic vinyl monomers such as styrene, alpha-methylstyrene, p-methylstyrene, halogenated styrene and divinylbenzene; unsaturated nitriles such as acrylonitrile; unsaturated (meth)acrylates such as methyl (meth)acrylate, ethyl (meth)acrylate, butyl (meth)acrylate, 2-ethylhexyl (meth)acrylate, lauryl (meth)acrylate and glycidyl (meth)acrylate; conjugated diolefins such as butadiene and isoprene; and vinylpyridine, vinylidene chloride, (meth)acrylamide, N-methylol (meth)acrylamide, 2-hydroxyethyl (meth)acrylate, diallylphthalate, allyl (meth)acrylate and vinyl acetate. These monomers may, if desired, be used in combination.

Any subsidiary material ordinarily used in emulsion polymerization may be used in the production of the carboxyl-containing polymer latex in this invention. For example, there can be used anionic surface-active agents such as sodium dodecylbenzenesulfate, nonionic surface-active agents such a polyoxyethylene nonyl phenyl ether, builders such as sodium sulfate, inorganic dispersion stabilizers such as hexametaphosphoric acid, and polymerization initiators such as potassium persulfate.

The method of polymerization is not limited, either, and ordinary methods such as a batch, semibatch or continuous method may be used.

In the process of this invention, it is essential to neutralize the polymer obtained by polymerization with a base. The base is not limited in particular and may include alkali metal hydroxides such as sodium hydroxide, potassium hydroxide and lithium hydroxide; ammonia; and amine compounds dimethylamine and diethanolamine.

It is necessary in the process of this invention to adjust the pH of the carboxyl-containing polymer latex to at least 7 by adding the base to the polymer latex To effectively render the polymer latex particles hollow, the pH is adjusted preferably to at least 8, more preferably to at least 10. However, if the pH becomes 13 or more, the stability of the polymer latex is reduced undesirably. It is also necessary to swell the polymer latex particles fully after adding the base.

In order to neutralize the carboxyl groups in the interior of the latex particles by the base and swell the polymer particles, it is preferable to stir the latex sufficiently after adding the base and thereby to diffuse the base in the interior of the latex particles. In order to increase the rate of diffusion, the base treating temperature is desirably higher than the temperature at which the latex polymer is softened. Specifically, it is preferred to maintain a temperature slightly lower than the glass transition temperature of the latex polymer, or a higher temperature. The treating time after the addition of the base, which differs depending upon the amount of the carboxyl groups in the polymer latex, is usually at least 10 minutes. The addition of the base might cause shock to the polymer latex and the consequent coagulation of the latex. To prevent it, the anionic surface-active agent or the nonionic surface-active agent or both may be added to the latex before the addition of the base.

It is also essential in the process of this invention to add an acid to the polymer latex after the treatment with the base and thus to adjust the pH of the latex to 7 or less, preferably 5 or less. If the pH of the latex falls below 1.5, its stability is undesirably decreased. The acid is not particularly limited, and may be, for example, a mineral acid such as hydrochloric acid or sulfuric acid or an organic acid such as acetic acid or malonic acid. The treating temperature and time in the acid treatment are the same as in the base treatment. The anionic surface-active agent or the nonionic surface-active agents or both may be added to the latex before the addition of the acid in order to prevent coagulation of the latex by the shock caused by the addition of the acid.

It has not yet been made clear why the acid treatment renders the polymer latex particles hollow. However, this phenomenon can be determined, for example, by changes in the amount of the carboxylic acid on the surface of the particles measured by conductometric titration, changes in particle diameter, and observation of the morphology of the resulting latex particles under a transmission-type electron microscope.

The polymer latex particles so obtained are hollow particles containing water. By drying the polymer latex, polymer particles having microvoids can be recovered.

The following examples illustrate the present invention more specifically.

EXAMPLE 1

Deionized water (371 ml) was put in a 3-liter four-necked flask, and 5.1 g of styrene, 1.44 g of butyl acrylate and 0.5 g of methacrylic acid were added, and the mixture was stirred. A eflux condenser, a thermometer and a separating funnel were attached to the four-necked flask, and the flask was heated to 70° C. Then, 75 ml of a 1% aqueous solution of potassium persulfate (KPS) was added to the flask through the dropping funnel, and the polymerization reaction was started. When two hours elapsed after the start of the reaction, a monomeric mixture composed of 97 g of styrene, 27.4 g of butyl acrylate and 19.2 g of methacrylic acid was added dropwise over the course of 12 hours. The mixture was heated for an additional 1 hour to complete the polymerization reaction.

The resulting latex had a pH of 3.3, and the reaction conversion measured by a weight method was 98.9%. It had a weight average particle diameter, measured by a light scattering method (Model 119800 made by Melvern Company), of 0.40 micrometer. The amount of the carboxylic acid on the surface of the latex particles, measured by conductometric titration in a customary manner, was 0.1 milliequivalent/g of polymer.

A 1% aqueous KOH solution (1285 g) was added to the resulting latex. The pH of the latex reached 12.0. Thereafter, the mixture was stirred at 70° C. for 3 hours. The latex treated with the base had a pH of 11.8. The amount of the carboxylic acid o the surface of the latex particles after the base treatment was 0.3 milliequivalent/g of polymer, and the latex had a particle diameter of 0.56 micrometer.

The above data show that (1) as a result of the base treatment, the carboxyl-containing polymer in the interior of the latex particles migrated to the surface of the particles, and consequently the amount of the carboxylic acid on the surface of the particles increased; (2) because of (1), the hydrophilicity of the latex particles increased, and the latex particles were water-swollen and also increased in particle diameter.

Then, 340 g of 1% hydrochloric acid was added to the latex treated with the base to adjust the pH of the latex to 2.2, and the mixture was then stirred at 70° C. for 30 minutes. After the acid treatment, the latex was left to stand at room temperature. The latex after the acid treatment had a pH of 2.3. The amount of the carboxylic acid on the surface of the latex particles was 0.07 milliequivalent/g of polymer, and the latex particles had a particle diameter of 0.54 micrometer.

The polymer particles were dried to form a powder composed of primary particles, and embedded in an epoxy resin. An ultrathin slice was prepared from the resulting material by using an ultramicrotome. The thin slice was observed under a transmission-type electron microscope, and found to be hollow.

EXAMPLE 2

A 1% aqueous KOH solution (130 g) was added to the latex obtained in Example 1 (before the base treatment). The latex had a pH of 7.3. The mixture was then stirred at 70° C. for 3 hours. After the base treatment, the latex had a pH of 7.2. The amount of the carboxylic acid on the surface of the latex particles after the base treatment was 0.21 milliequivalent/g of polymer, and the latex particles had a particle diameter of 0.49 micrometer.

To the latex treated with the base was added 85 g of 1% hydrochloric acid to adjust the pH of the latex to 3.2. The mixture was then stirred at 70° C. for 30 minutes, and then left to stand at room temperature. The latex after the acid treatment had a pH of 5.0. The amount of the carboxylic acid on the surface of the latex particles was 0.07 milliequivalent/g of polymer, and the latex particles had a particle diameter of 0.49 micrometer.

The resulting polymer particles were dried to form a powder composed of primary particles and embedded in an epoxy resin. An ultrathin slice was prepared from the resulting material by using an ultramicrotome. The thin slice was observed under a transmission-type electron microscope, and found to be hollow.

COMPARATIVE EXAMPLE 1

A 1% aqueous KOH solution (50 g) was added to the latex obtained in Example 1 (before the base treatment). The latex had a pH of 5.2. Then, the mixture was stirred at 70° C. for 3 hours. After the base treatment, the latex had a pH of 4.8. After the base treatment, the amount of the carboxylic acid on the surface of the latex particles was 0.11 milliequivalent/g of polymer, and the latex particles had a particle diameter of 0.41 micrometer.

To the latex treated with the base was added 200 g of 1% hydrochloric acid to adjust the pH of the latex to 1.8. The mixture was then stirred at 70° C. for 30 minutes, and then left to stand at room temperature. The latex after the acid treatment had a pH of 2.0. The amount of the carboxylic acid on the surface of the latex particles was 0.08 milliequivalent/g of polymer, and the latex particles had a particle diameter of 0.40 micrometer.

The resulting polymer particles were dried to form a powder composed of primary particles and embedded in an epoxy resin. An ultrathin slice was prepared from the resulting material by using an ultramicrotome. The thin slice was observed under a transmission-type electron microscope, and found to be not hollow.

EXAMPLE 3

To the latex obtained in Example 1 (before the acid treatment) was added 250 g of 1% hydrochloric acid to adjust the pH of the latex to 6.8. Then, the mixture was stirred at 70° C. for 30 minutes. After the acid treatment, the latex was left to stand at room temperature. The latex treated with the acid had a pH of 9.2. The amount of the carboxylic acid on the surface of the latex particles was 0.11 milliequivalent/g of polymer, and the latex particles had a particle diameter of 0.52 micrometer.

The resulting polymer particles were dried to form a powder composed of primary particles and embedded in an epoxy resin. An ultrathin slice was prepared from the resulting material by using an ultramicrotome. The thin slice was observed under a transmission-type electron microscope, and found to be hollow.

COMPARATIVE EXAMPLE 2

To the latex obtained in Example 1 (before the acid treatment) was added 230 g of 1% hydrochloric acid to adjust the pH of the latex to 7.5. The mixture was then stirred at 70° C. for 30 minutes. The treated latex was left to stand at room temperature. The latex after the acid treatment had a pH of 9.8. The amount of the carboxylic acid on the surface of the latex particles was 0.26 milliequivalent/g of polymer, and the latex particles had a particle diameter of 0.53 micrometer.

The resulting polymer particles were dried to form a powder composed of primary particles and embedded in an epoxy resin. An ultrathin slice wa prepared from the resulting material by using an ultramicrotome. The thin slice was observed under a transmission-type electron microscope, and found to be not hollow.

EXAMPLE 4

Deionized water (1000 ml) was put in a 10-liter autoclave, and 20 g of sodium laurylsulfate, 160 g of styrene, 30 g of butadiene and 10 g of methacrylic acid were added and heated to 70° C. Then, 800 ml of 1% potassium persulfate was added to start the polymerization. After the lapse of 2 hours, a monomeic mixture as an emulsion composed of 4000 ml of deionized water, 20 g of sodium laurylsulfate, 3040 g of styrene, 570 g of butadiene and 190 g of methacrylic acid was added continuously over 12 hours by a plunger pump to an autoclave where the reaction was being carried out. The reaction was then continued for 2 hours.

The resulting latex had a pH of 2.5, and the reaction conversion measured by the weight method was 98.8%. The latex had a particle diameter, measured by the light scattering method, of 0.24 micrometer. The amount of the carboxylic acid on the surface of the particles, measured by conductometric titration, was 0.20 milliequivalent/g of polymer.

Five liters of the resulting latex (solids content 40.7%) was put in another autoclave, and 1500 g of a 5% aqueous solution of KOH was added. The pH of the latex was 11.8. Then, the mixture was stirred at 60° C. for 24 hours. The treated latex had a pH of 11.7. The amount of the carboxylic acid on the surface of the latex particles was 0.41 milliequivalent/g of polymer, and the latex particles had a particle diameter of 0.31 micrometer.

To the latex treated with the base was added 980 g of 5% hydrochloric acid to adjust the pH of the latex to 2.5. The mixture was then stirred at 60° C. for 1 hour, and then left to stand at room temperature. The treated latex had a pH of 2.3. The amount of the carboxylic acid on the surface of the latex particles was 0.08 milliequivalent/g of polymer, and the latex particles had a particle diameter of 0.29 micrometer.

The resulting polymer particles were observed under a transmission-type electron microscope as in Example 1 and found to be hollow.

We claim:

1. A process for producing hollow polymer latex particles, which comprises
    (1) adding a base to a carboxyl-containing polymer latex obtained by emulsion polymerization of a monomeric mixture composed of at least 0.1% by weight of an ethylenically unsaturated carboxylic acid and another ethylenically unsaturated monomer copolymerizable with the carboxylic acid to thereby adjust the pH of the polymer latex to at least 7 and swell the polymer latex particles, and
    (2) adding an acid to the polymer latex formed in (1) to thereby adjust the pH of the latex to not more than 7.

2. The process of claim 1 in which the monomeric mixture contains 0.1 to 40% by weight of the ethylenically unsaturated carboxylic acid.

3. The process of claim 1 in which the monomeric mixture contains 0.5 to 20% by weight of the ethylenically unsaturated carboxylic acid.

4. The process of claim 1 in which the pH of the polymer latex is adjusted to 8 to 13 in step (1) by adding the base.

5. The process of claim 1 in which the pH of the polymer latex is adjusted to 10 to 13 in step (1) by adding the base.

6. The process of claim 1 in which the latex of the polymer is adjusted to 1.5 to 5 in step (2) by adding the acid.

* * * * *